US012792871B2

(12) United States Patent
Kim et al.

(10) Patent No.: US 12,792,871 B2
(45) Date of Patent: Nov. 10, 2026

(54) METHOD AND APPARATUS FOR PERFORMING MULTI-TASK LEARNING BASED ON TASK SIMILARITY

(71) Applicant: Electronics and Telecommunications Research Institute, Daejeon (KR)

(72) Inventors: Eun Woo Kim, Daejeon (KR); Hyun Dong Jin, Daejeon (KR); Ki Min Yun, Daejeon (KR); Jin Young Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1387 days.

(21) Appl. No.: 17/535,486

(22) Filed: Nov. 24, 2021

(65) Prior Publication Data

US 2023/0059462 A1 Feb. 23, 2023

(30) Foreign Application Priority Data

Aug. 10, 2021 (KR) ........................ 10-2021-0105063

(51) Int. Cl.
*G06N 3/04* (2023.01)

(52) U.S. Cl.
CPC ...................................... *G06N 3/04* (2013.01)

(58) Field of Classification Search
CPC ........ G06N 3/04; G06N 3/045; G06N 3/0464; G06N 3/096; G06N 3/082; G06N 3/08; G06N 3/0475; G06N 3/047; G06N 3/0495; G06N 3/0499; G06N 3/0455; G06N 3/0895; G06N 3/09; G06N 3/091; G06N 3/092; G06N 3/094; G06N 3/098; G06N 3/0985
USPC ............................................................ 706/25
See application file for complete search history.

(56) References Cited

U.S. PATENT DOCUMENTS

| | | | | |
|---|---|---|---|---|
| 10,783,449 B2 | 9/2020 | Parthasarathy et al. | | |
| 10,957,017 B1 * | 3/2021 | Minor | .................... | G06V 10/82 |
| 2020/0163641 A1 * | 5/2020 | Amit | ...................... | A61B 6/502 |
| 2020/0167659 A1 | 5/2020 | Moon et al. | | |

(Continued)

FOREIGN PATENT DOCUMENTS

| | | | | |
|---|---|---|---|---|
| KR | 102071179 B1 | 1/2020 | | |
| KR | 102111396 B1 | 5/2020 | | |
| KR | 20200046184 A * | 5/2020 | ............... | G06N 3/02 |

(Continued)

OTHER PUBLICATIONS

Su, Fang et al., Low-Rank Deep Convolutional Neural Network for Multitask Learning, May 19, 2019, Computational Intelligence and Neuroscience, vol. 2019, issue 1, pp. 1-2 (Year: 2019).*

(Continued)

*Primary Examiner* — Tsu-Chang Lee
(74) *Attorney, Agent, or Firm* — WILLIAM PARK AND ASSOCIATES LTD.

(57) ABSTRACT

A method for performing multi-task learning based on task similarity includes performing a similarity analysis between a first task and a second task and training a neural network for the second task based on a result of the similarity analysis. In response to determining that a first training dataset used for the first task and a second training dataset used for the second task are similar, the neural network learns a second parameter allocated to the second training dataset based on a first parameter allocated to the first training dataset.

15 Claims, 9 Drawing Sheets

(56) References Cited

U.S. PATENT DOCUMENTS

2020/0302339 A1* 9/2020 Nadamuni Raghavan .................. G06F 3/0659
2021/0012213 A1 1/2021 Kim et al.

FOREIGN PATENT DOCUMENTS

WO WO-2018188981 A1 * 10/2018 ........... G06F 40/279
WO 2019202073 A1 10/2019

OTHER PUBLICATIONS

Yan, Cairong et al., A Multi-Task Learning Model for Better Representation of Clothing Images, Mar. 12, 2019, IEEE Access, vol. 7, p. 34501 (Year: 2019).*
Zhang, Yu et al., An Overview of Multi-Task Learning, Sep. 1, 2017, National Science Review, vol. 5, p. 34 (Year: 2017).*
Wang, Chunzhi et al., Image Classification Based on Principal Component Analysis Optimized Generative Adversarial Networks, Nov. 13, 2020, Multimedia Tools and Applications, vol. 80, p. 9689 (Year: 2020).*
Fchollet, Transfer Learning & Fine-Tuning, May 12, 2020, Keras (Year: 2020).*
Cuong V. Nguyen et al., "Toward Understanding Catastrophic Forgetting in Continual Learning," arXiv:1908.01091v1 [cs.LG] Aug. 2, 2019 (Aug. 2, 2019.).
Sebastian Thrun et al., "Discovering Structure in Multiple Learning Tasks: The TC Algorithm," Proceedings of the Thirteenth International Conference on Machine Learning (Jul. 3, 1996.).

* cited by examiner

METHOD AND APPARATUS FOR PERFORMING MULTI-TASK LEARNING BASED ON TASK SIMILARITY

CROSS REFERENCE TO RELATED APPLICATION

The present application claims priority to KR application 10-2021-0105063, filed Aug. 10, 2021, the entire contents of which are incorporated herein for all purposes by this reference.

BACKGROUND OF THE INVENTION

Field of the Invention

The present disclosure relates to a method and apparatus for performing multiple tasks based on task similarity by using artificial intelligence.

Description of the Related Art

Artificial intelligence, big data, Internet of Things (IoT), cloud computing and other technologies are widely applied in the name of the Fourth Industrial Revolution. Artificial intelligence is a technology focusing mainly on solving cognition-related problems of human intelligence such as learning, problem solving and pattern recognition. Latest advancement in computing efficiency accelerates the development of AI-based machine learning techniques. Likewise, the advancement of network computing further speeds up the development and application of deep learning techniques. Deep learning may be applied to various fields including pose finding, data distinction and photo restoration, and as deep learning-based techniques are highlighted more than before, deep learning models are expected to be lighter and more efficient.

Representative methods of lightening deep learning models are pruning and distillation, and multi-task learning is one of techniques that not only enhance network efficiency but also lighten a deep learning model.

Multi-task learning expands and applies the existing deep learning techniques to multiple tasks. The existing deep learning performs only one task in one model, but multi-task learning optimizes multiple tasks in one model at the same time. Compared to the existing deep learning, multi-task learning may be more efficient on the ground that more outputs are produced at the same cost. Multi-task learning may enable efficient usage of limited resources, thereby providing better services to users.

Especially, when the deep learning technology is applied to on-device products, since such on-device products have limited resources that are not sufficient to provide capacity to each task, it may be impossible that multiple tasks occupy memories independently from each other. Therefore, multi-task learning techniques are essential in commercializing deep learning, and the study on multi-task learning techniques of deep learning becomes more important.

SUMMARY

An object of the present disclosure is to provide a method and apparatus for performing multiple tasks based on task similarity by using artificial intelligence.

An object of the present disclosure is to provide a method and apparatus for efficient learning that enables consecutive multi-task learning when training a single neural network.

An object of the present disclosure is to train a neural network with a limited memory.

Other objects and advantages of the present disclosure will become apparent from the description below and will be clearly understood through embodiments of the present disclosure. It is also to be easily understood that the objects and advantages of the present disclosure may be realized by means of the appended claims and a combination thereof.

According to an embodiment of the present disclosure, a method for performing multi-task learning based on task similarity may include performing a similarity analysis between a first task and a second task and training a neural network for the second task based on a result of the similarity analysis. Herein, wherein in response to be determined that a first training dataset used for the first task and a second training dataset used for the second task are similar, the neural network may learn a second parameter allocated to the second training dataset based on a first parameter allocated to the first training dataset.

Meanwhile, the neural network may be pre-trained for the first task by using the first training dataset.

Meanwhile, the first training dataset and the second training dataset may be image dataset.

Meanwhile, the first training dataset and the second training dataset may be image datasets for which dimension reduction is performed.

Meanwhile, the similarity analysis may include producing a similarity by calculating a distance between image vectors through image clustering of the first training dataset and the second training dataset.

Meanwhile, the distance between image vectors may be compared with a preset threshold.

Meanwhile, the similarity may be defined in a form of a one-hot vector.

Meanwhile, the neural network may be based on a fully connected layer.

According to an embodiment of the present disclosure, an apparatus for performing multi-task learning based on task similarity may include a memory configured to store data and a processor configured to control the memory. Herein, the processor may be further configured to perform a similarity analysis between a first task and a second task, to train a neural network for the second task based on a result of the similarity analysis, and, wherein in response to be determined that a first training dataset used for the first task and a second training dataset used for the second task are similar, to learn a second parameter allocated to the second training dataset based on a first parameter allocated to the first training dataset.

Meanwhile, the neural network may be pre-trained for the first task by using the first training dataset.

Meanwhile, the first training dataset and the second training dataset may be image dataset.

Meanwhile, the first training dataset and the second training dataset may be image datasets for which dimension reduction is performed.

Meanwhile, the similarity analysis may include producing a similarity by calculating a distance between image vectors through image clustering of the first training dataset and the second training dataset.

Meanwhile, the distance between image vectors may be compared with a preset threshold.

Meanwhile, the similarity may be defined in a form of a one-hot vector.

Meanwhile, the neural network may be based on a fully connected layer.

According to an embodiment of the present disclosure, a program stored in a non-transitory computer-readable medium may implement: performing a similarity analysis between a first task and a second task; training a neural network for the second task based on a result of the similarity analysis; and wherein in response to be determined that the first training dataset used for the first task and the second training dataset used for the second task are similar, the neural network learns a second parameter allocated to a second training dataset based on a first parameter that is allocated to a first training dataset, According to the present disclosure, multi-task learning may be performed based on a single neural network.

According to the present disclosure, efficient multi-task learning may be performed using limited resources.

According to the present disclosure, multi-task learning based on deep learning may be performed on an on-device product.

Effects, which may be obtained from embodiments of the present disclosure, are not limited to the above-mentioned effects, and other effects not mentioned herein may be clearly understood based on the following description of the embodiments of the present disclosure by those skilled in the art to which a technical configuration of the present disclosure is applied. Effects not intended by performing a configuration described in the present disclosure may also be derived from the embodiments of the present disclosure by those skilled in the art.

DETAILED DESCRIPTION

Figure 1:
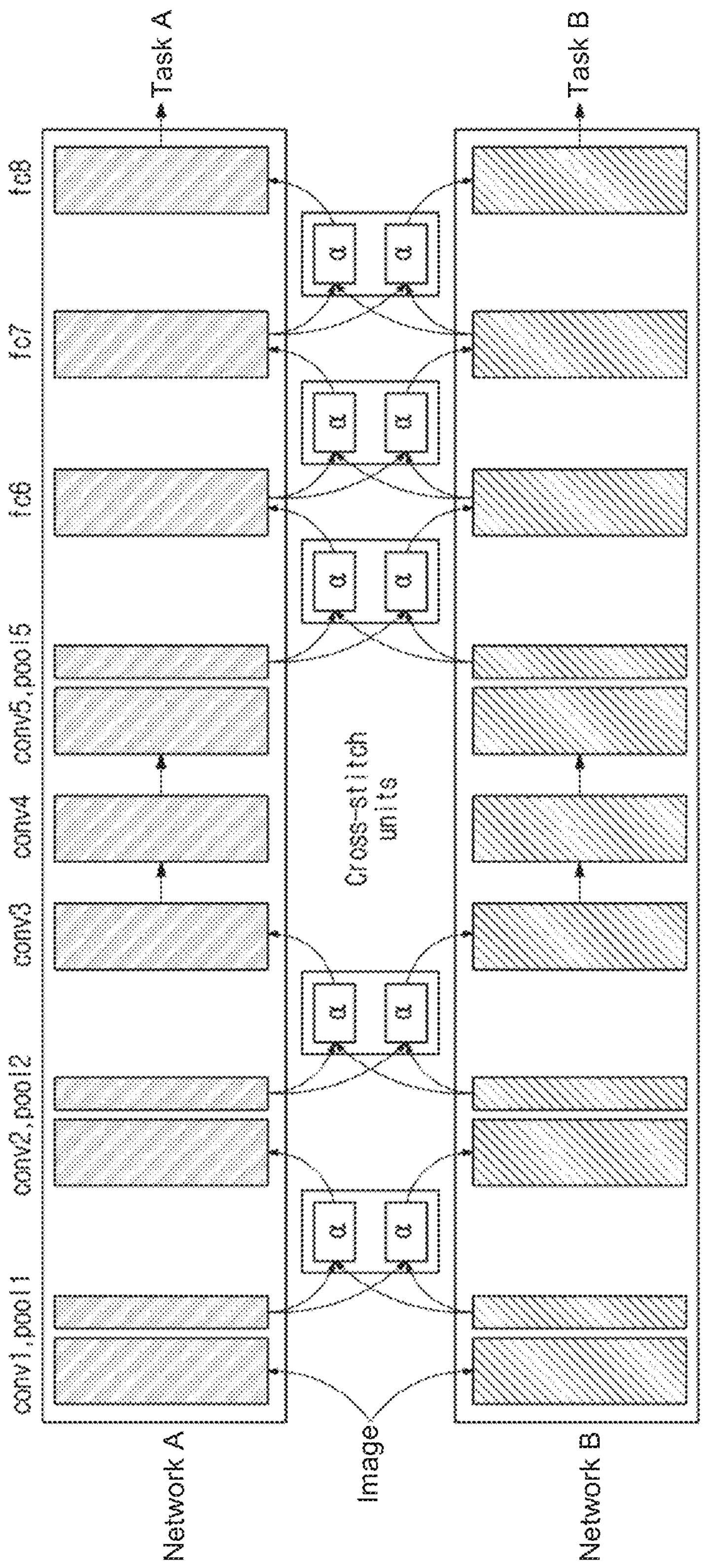
FIG. 1 is a view showing a multi-task learning technique based on a cross-stitch structure according to the present disclosure.

Hereinafter, embodiments of the present disclosure will be described in detail with reference to the accompanying drawings, which will be easily implemented by those skilled in the art. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. In addition, parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, embodiments that include other components in addition to the components described in the various embodiments are also included in the scope of the present disclosure.

Hereinafter, in the description of embodiments of the present disclosure, the terms “model”, “network” and “neural network” may be used interchangeably.

Hereinafter, the present disclosure will be described in detail with reference to the accompanying drawings.

FIG. 1 is a view showing a multi-task learning technique based on a cross-stitch structure according to the present disclosure.

A multi-task learning technique based on a neural network may be more efficient than the existing deep learning techniques on the ground that the multi-task learning technique is capable of producing results of more diverse tasks at the same computation and computational cost.

A cross-stitch network, which implements multi-task learning based on a structural approach by expanding the existing deep learning technique, is a structure that enables multiple tasks to be performed in parallel and is based on a cross-stitch unit introduced between individual networks. That is, when it is assumed that a network A is trained for a task A and a network B is trained for a task B, a cross-stitch unit enables knowledge to be shared between task-specific networks, that is, between the network A and the network B.

Meanwhile, consequently, a cross-stitch network performs only one task per network, and when the number of tasks increases, the number of parameters linearly increases and thus computation may also increase.

Figure 2:
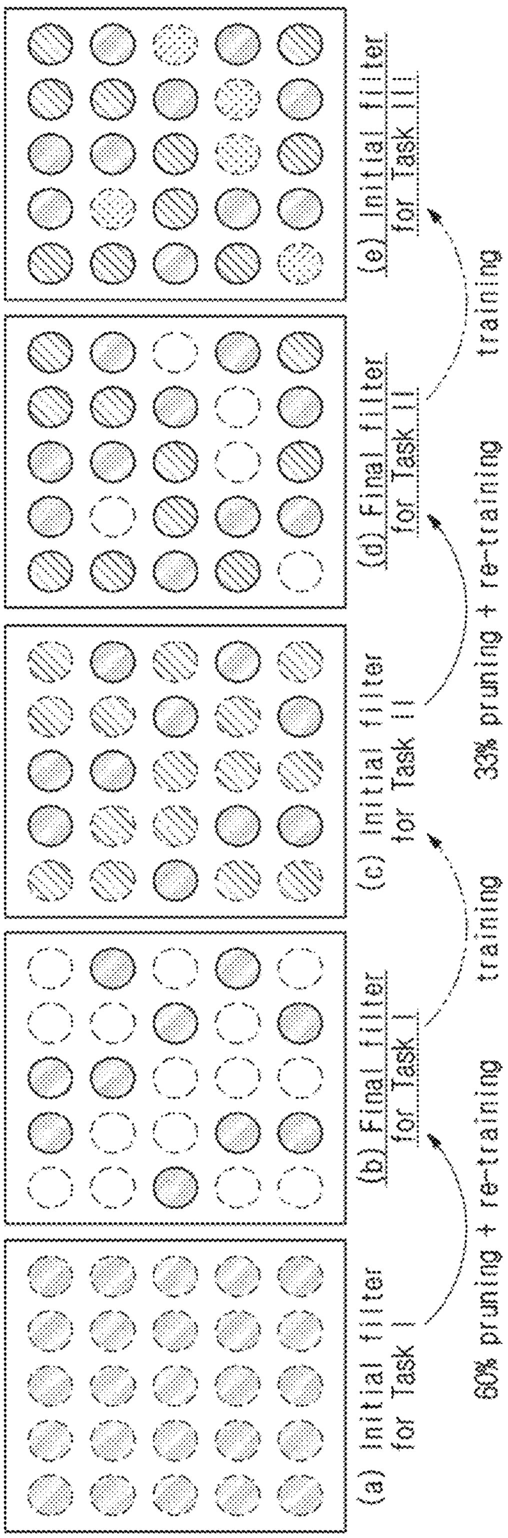
FIG. 2 is a view showing a multi-task learning technique based on parameter allocation according to the present disclosure.

FIG. 2 is a view showing a multi-task learning technique based on parameter allocation according to the present disclosure.

In consecutive multi-task learning, while the learning is performed, the loss of contents previously learned (catastrophic forgetting) does not occur only by maintaining the performance of a model that is trained by a previous training dataset for a previous task. In order to prevent a previously learned content, that is, a content learned for a preceding task from being changed, there is a method for allocating an important parameter to a model (neural network) during the preceding task. Allocating an important parameter to a model is very advantageous in maintaining performance since the allocated parameter does not change even when learning is performed using another dataset.

As an embodiment, the model of FIG. 2 sets up a learning process with three steps (training→pruning→re-training). First, it is assumed that 60% pruning of parameter is performed at an initial filter (a) for Task I and then re-training is performed. Next, a final filter (b) for Task I is learned for Task II and this is an initial filter (c) for Task II. Next, re-training is performed after 33% pruning to generate a final filter for Task II and then learning for Task III may be performed.

A pruning process for removing unnecessary parameters other than important parameters after learning may remove parameters that do not have a significant influence on performance. As an embodiment, a weight of parameter may be used as a criterion for select parameters that do not significantly affect performance.

A re-training process may include a process of re-training an important parameter that is a last one left.

Meanwhile, as the multi-task learning technique described above utilizes all the parameters together during an inference process without considering a relationship of tasks (e.g., I, II and III), the multi-task learning technique may be more efficient when tasks are highly relevant to each other. That is, using the multi-task learning technique when tasks are highly relevant to each other may further maximize the advantage of the technique, rather than when there is a few relevance among tasks or it is difficult to determine the relevance among them (e.g., when no following task is determined).

Accordingly, hereinafter, a multi-task learning technique according to the present disclosure will be described which is efficient not only when tasks are highly relevant to each other but also when the tasks are not highly relevant to each other or no following task is determined. According to the multi-task learning technique based on task similarity according to the present disclosure, as similar tasks are autonomously determined when multiple tasks are consecutively learned, only relevant task parameters are used for inference in training a multi-task model so that consecutive multi-task learning becomes more efficient.

The multi-task learning technique based on task similarity according to the present disclosure may allocate different parameters to each task, when allocating parameters as described above, and in consecutive multi-task learning where datasets do not enter at once, a parameter of a model that is trained fora previous dataset is maintained even when the model is trained for a subsequent dataset so that the performance of the model may be maintained for the previous dataset and the subsequent dataset.

In addition, when all the parameters are used together during an inference process without considering a relationship between tasks, that is, when a parameter for a model that is previously trained is referenced for learning a current dataset of a totally different type, the parameter may become a noise for learning a currently allocated parameter and thus may disturb smooth learning. Accordingly, learning may be efficient by selecting a parameter for a dataset among parameters for a previously learned dataset through a similarity analysis between tasks. Thus, in the multi-task learning technique based on task similarity according to the present disclosure, as similar tasks are autonomously determined when multiple tasks are consecutively learned, only relevant task parameters are used for inference in training a multi-task model so that consecutive multi-task learning becomes more efficient.

Figure 3:
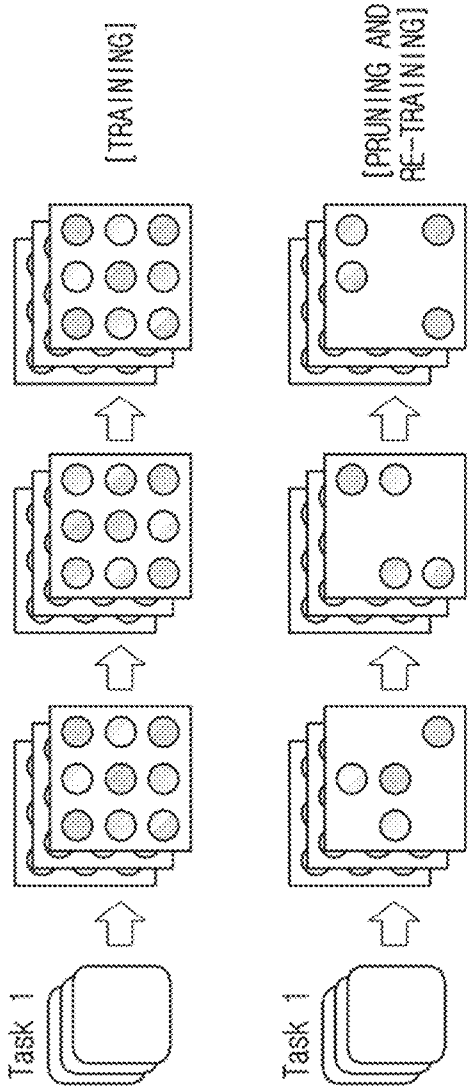
FIG. 3 is a view showing a multi-task learning process according to an embodiment of the present disclosure.

FIG. 3 is a view showing a multi-task learning process according to an embodiment of the present disclosure.

Specifically, FIG. 3 shows a process of training, pruning and re-training for a first training dataset for a first task during a process of training a visual information imbedding model capable of consecutive multi-task learning according to an embodiment of the present disclosure. As an embodiment, multiple tasks are all assumed to be tasks related to visual information, and a multi-task learning process may consist of two processes. The first one may be a process of performing a similarity analysis for tasks that enter consecutively, and the second one may be a process of consecutive task learning based on a result of the similarity analysis.

As an example, in order to make a similarity analysis between visual tasks possible, that is, in order to make a similarity analysis of tasks based on visual data possible, a neural network may be trained based on similarity of training datasets. When a parameter for a neural network model, which is previously trained, is referenced for learning a current dataset of a totally different type, the parameter may become a noise for learning a currently allocated parameter and thus may disturb smooth learning. Accordingly, in order to learn a current training dataset through a similarity analysis, a parameter of a training dataset to be used for learning needs to be selected among parameters of datasets that are already learned.

In addition, in a method of using an imbedding model for multiple visual tasks, since training datasets may not enter together, when the model is trained for a dataset and then is trained for another dataset, the model should be so trained as to maintain its performance for a currently learned dataset. According to the present disclosure, as learning may be performed using datasets that enter consecutively, the performance of a model for an already learned dataset does not deteriorate due to learning.

The circles shown in FIG. 3 may mean parameters that are allocated for learning by means of certain training datasets. After learning is performed for one training dataset, unnecessary parameters may be pruned. Herein, the unnecessary parameters may be selected based on absolute values of parameters, and parameters with small absolute values may be mainly pruned. Herein, a parameter for a dataset that is previously learned may not be pruned.

Model learning based on similarity between tasks may be performed by determining how similar a current dataset to be learned by a model is to a dataset that is already learned by the model. That is, when a current neural network model is trained according to a first training dataset of a first task that is a preceding task, a similarity may be determined with a second training dataset of a second task that is a following task.

As an embodiment, when a first training dataset and a second training dataset are image datasets, high-dimensional dimension reduction of images may be performed to determine similarity. When image dimension reduction is performed, image vectors reduced to a lower dimension may be clustered and thus a similarity may be produced by calculating a distance of center values between a current dataset and a dataset that is already learned. This process may be performed based on the image clustering of FIG. 4 and will be described in further detail with reference to FIG. 4.

Figure 4:
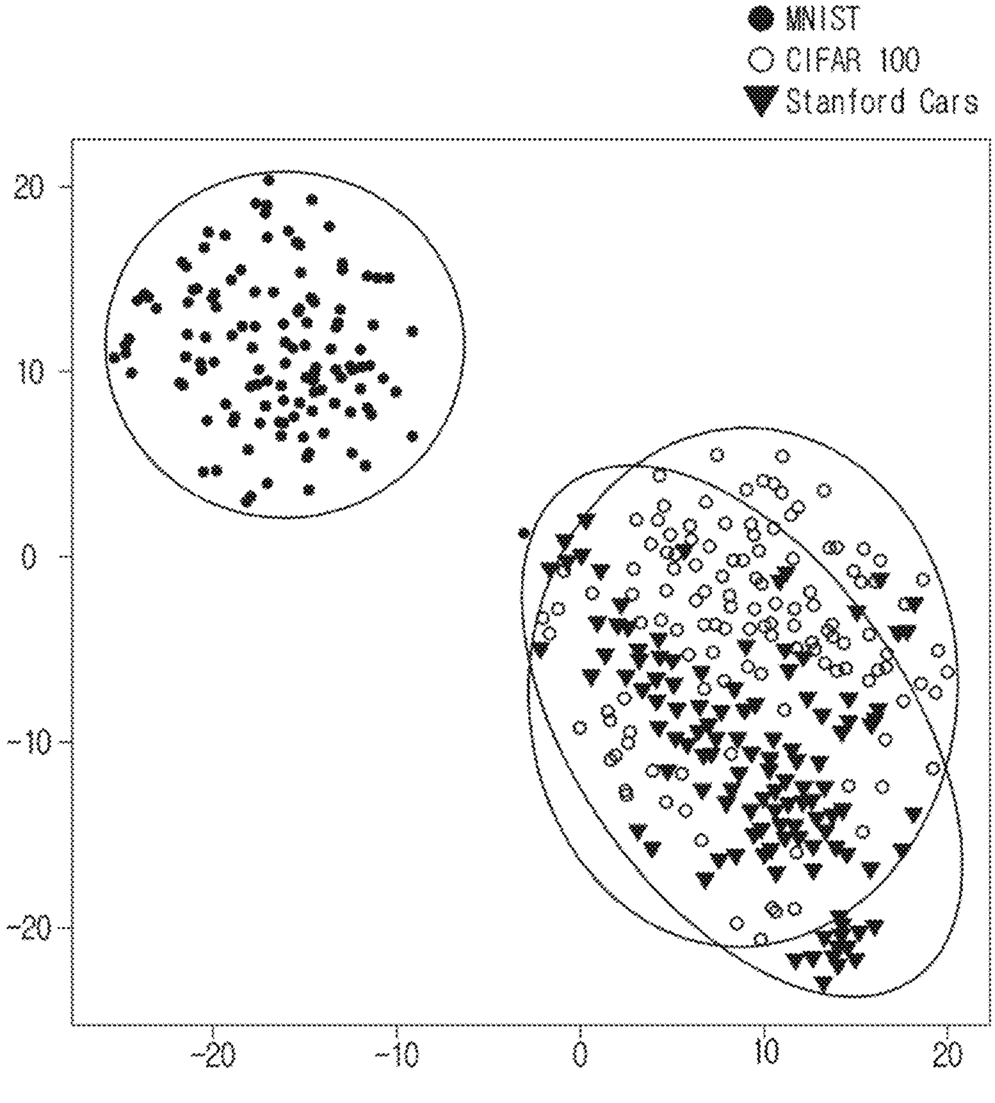
FIG. 4 is a view showing imbedding visualization according to an embodiment of the present disclosure.

FIG. 4 is a view showing imbedding visualization according to an embodiment of the present disclosure.

FIG. 4 is a view for visual identification of image imbedding and, for clarity of explanation, assumes the presence of three different training datasets. As an embodiment, FIG. 4 is a view showing a plotting result that is obtained by reducing image imbedding for the three different training datasets to 2 dimensions. As an example, a final similarity between tasks may be defined by a form of one-hot-vector as represented by the following formula.

$$\Phi_T = [\Phi_{1,T}, \Phi_{2,T}, \ldots, \Phi_{T-1,T}] \quad \text{[Formula 1]}$$

$$\Phi_{i,T}\begin{cases} 1 & \text{if } Dist(i, T) > \text{Threshold} \\ 0 & \text{otherwise} \end{cases}, i \in (1, \ldots T-1)$$

$$Dist(i, t) = \text{Distance } (C_i, C_t)$$

As an embodiment, according to the above formula, when a distance between center values is equal to or greater than a threshold, it may be given 1, and when a distance between center values is less than the threshold, it may be given 0.

As an embodiment, after a similarity is determined first, learning may be performed based on the similarity. Performing learning based on similarity may include learning a parameter allocated to a current dataset based on a parameter allocated to a dataset that is already learned, when the current dataset entering a model for learning is similar to the dataset that is already learned.

As an example, a parameter allocated to a current dataset is defined as $f_k(\theta)$. Parameters of a model, which are used to learn a current dataset, may be expressed by the following formula.

$$f(\theta)^T_{forward} = \Phi_{1,T} f_1(\theta) + \Phi_{2,T} f_2(\theta) + \ldots + \Phi_{t-1,T} f_{t-1}(\theta) + f_T(\theta) \quad \text{[Formula 2]}$$

In the formula above, $$f(\theta)^T_{found}$$

denotes parameters that are used to forward pass a current training dataset to a model. Parameters that are actually being learned are parameters included in $$f(\theta)^T_{forward},$$

and only the values of parameters allocated for a current dataset may be updated.

Figure 5:
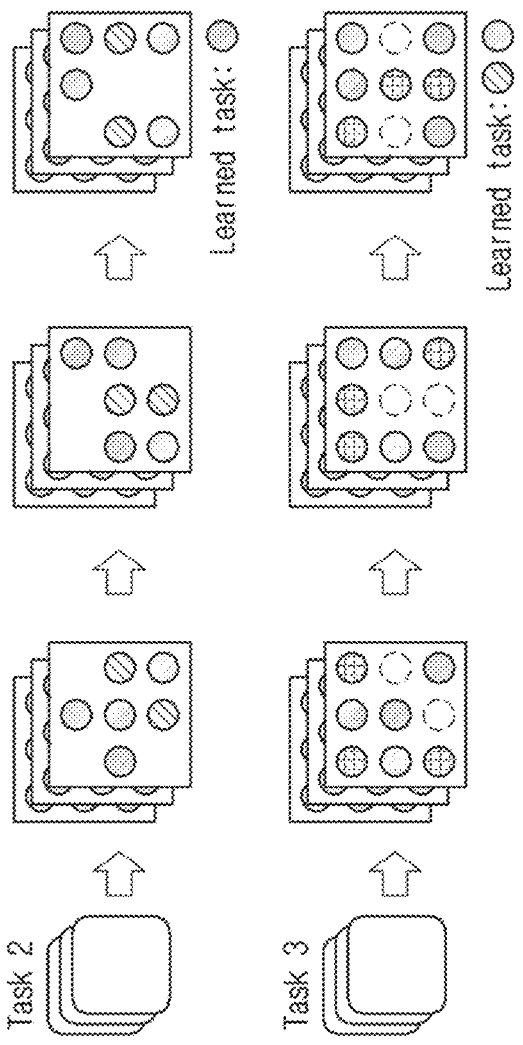
FIG. 5 is a view showing a multi-task learning process according to data similarity in accordance with an embodiment of the present disclosure.

FIG. 5 is a view showing a multi-task learning process according to data similarity in accordance with an embodiment of the present disclosure.

As an embodiment, FIG. 5 shows a case where another training dataset enters a neural network model while a previously learned dataset is present in the model. Particularly, FIG. 5 is a view assuming that a previously learned dataset is similar to a dataset to be learned.

FIG. 5 shows a parameter to be used when a third training dataset enters the model for learning and is similar to a first training dataset but is not similar to a second training dataset.

As an embodiment, it is assumed that learning of a first task based on a first training dataset and learning of a second task based on a second training dataset are performed through the above-described process of training→pruning→re-training.

As an embodiment, since the third task is not similar to the second task, a parameter related to the second task learning is rated with low importance with respect to learning for the third task and thus is not considered. Accordingly, when learning is performed for the second task, a parameter is updated using only a relationship of tasks having similarity in a learning process so that multiple visual memories may be learned more efficiently.

Figure 6:
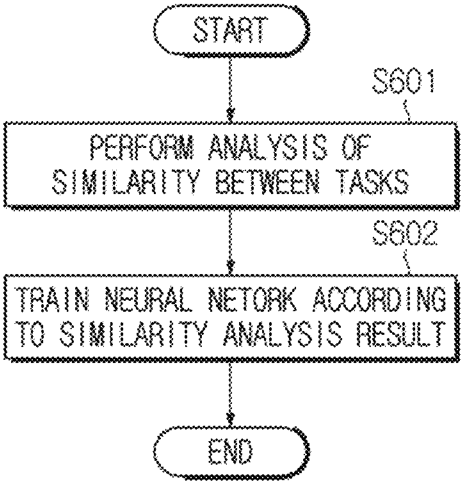
FIG. 6 is a view showing a multi-task learning method based on task similarity according to an embodiment of the present disclosure.

FIG. 6 is a view showing a multi-task learning method based on task similarity according to an embodiment of the present disclosure.

Figure 7:
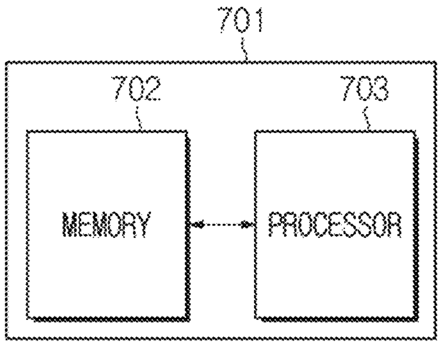
FIG. 7 is a view showing a multi-task learning apparatus based on task similarity according to an embodiment of the present disclosure.

As an embodiment, the multi-task learning method of FIG. 6 is based on multi-task learning that is mentioned above with reference to another drawing and may be implemented by the apparatus of FIG. 7 and another multi-task learning apparatus and a multi-task learning system, but the present disclosure is not limited thereto.

As an example, the multi-task learning method based on task similarity may perform a similarity analysis between tasks (S601). The tasks may include a first task, a second task and any n tasks and may be consecutive tasks. In addition, a training dataset for each task may be referred to as a n training dataset. However, multiple tasks may be predetermined or not before a neural network is trained. As an embodiment, when the first training dataset and the second training dataset are image datasets, the first training dataset and the second training dataset may be image data for which dimension reduction is performed, and a similarity analysis may include producing a similarity by calculating a distance between image vectors through image clustering. As an embodiment, the distance between image vectors is compared with a preset threshold, and when the distance is equal to or less than the threshold, a high similarity may be produced, and when the distance is greater than the threshold, a low similarity may be produced. In addition, the similarity may be defined in a form of a one-hot vector and be expressed by the formula below, as mentioned above.

$$\Phi_T = [\Phi_{1,T}, \Phi_{2,T}, \ldots, \Phi_{T-1,T}] \quad \text{[Formula 1]}$$

$$\Phi_{i,T}\begin{cases} 1 & \text{if } Dist(i, T) > \text{Threshold} \\ 0 & \text{otherwise} \end{cases}, i \in (1, \ldots T-1)$$

$$Dist(i, t) = \text{Distance } (C_i, C_t)$$

Next, based on a result of the similarity analysis, a neural network may be trained for the second task (S602). As an example, as mentioned above, when it is determined that the first training dataset used for the first task and the second training dataset used for the second task are similar to each other, the neural network may learn a second parameter allocated to the second training dataset based on a first parameter allocated to the first training dataset. This may be the same as described above with reference to Formula 2. As an embodiment, the neural network may be pre-trained for the first task by using the first training dataset. As an example, the neural network may be based on a fully connected layer.

As an embodiment, since the multi-task learning method of FIG. 6 is an embodiment, the order of each step may be modified, another step may be added, or some of the steps may be removed.

FIG. 7 is a view showing a multi-task learning apparatus based on task similarity according to an embodiment of the present disclosure.

As an embodiment, the multi-task learning apparatus 701 may include a memory 702 configured to store data and a processor 703 configured to control the memory.

As an embodiment, the multi-task learning apparatus may implement multi-task learning including the above-mentioned multi-task learning method.

As an embodiment, the processor may be further configured to perform a similarity analysis between a first task and a second task, to train a neural network for the second task based on a result of the similarity analysis, and, when determining that a first training dataset used for the first task and a second training dataset used for the second task are similar, to learn a second parameter allocated to the second training dataset based on a first parameter that is allocated to the first training dataset.

As an embodiment, the neural network may be pre-trained for the first task by using the first training dataset. In addition, the first training dataset and the second training dataset may be image datasets. The first training dataset and the second training dataset may be image datasets for which dimension reduction is performed. The similarity analysis may include producing a similarity by calculating a distance between image vectors through image clustering of the first training dataset and the second training dataset. The distance between image vectors may be compared with a preset threshold. The similarity may be defined in a form of a one-hot vector. The neural network may be based on a fully connected layer.

Meanwhile, the multi-task learning apparatus, which is described above with reference to the drawing, is illustrated by distinguishing the memory and the processor for clarity of explanation and thus may have a different configuration from the drawing. For example, the processor 703 may consist of an inter-task similarity analysis module and a multi-task learning module using a similarity analysis result, but the present disclosure is not limited thereto.

Figure 8:
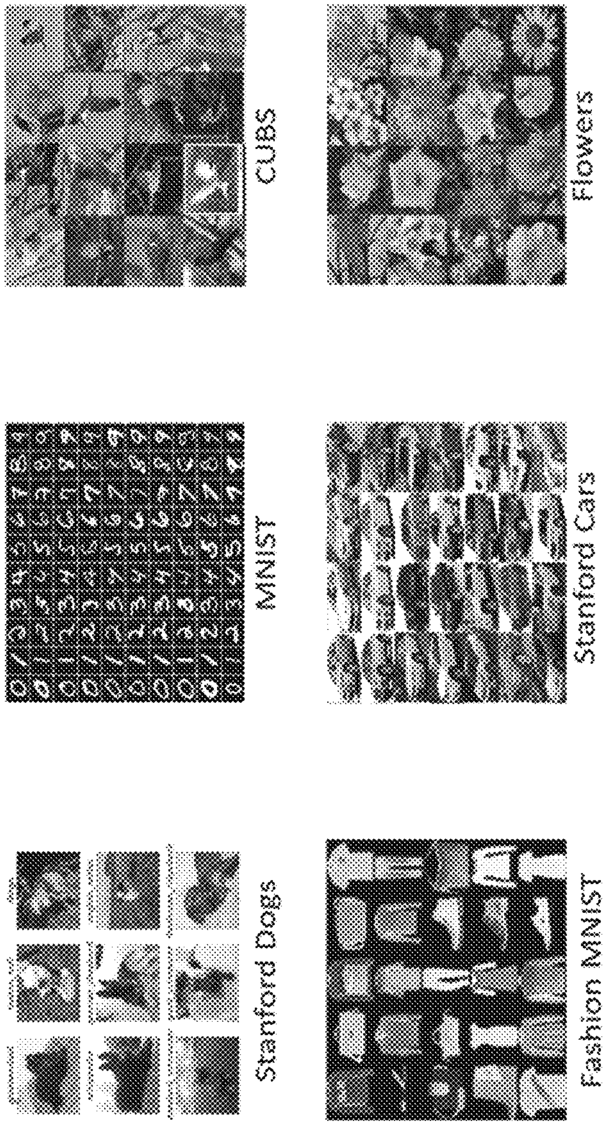
FIG. 8 is a view showing training datasets according to an embodiment of the present disclosure.

FIG. 8 is a view showing training datasets according to an embodiment of the present disclosure.

Specifically, FIG. 8 shows training datasets used for the above-described multi-task learning technique based on task similarity, and the training datasets are used for an experiment based on the multi-task learning described in the present disclosure.

As an embodiment, the training datasets may be ImageNet, Stanford dogs, MNIST, CUBS, Fashion MNIST, Stanford Cars, Flowers and the like. Hereinafter, for clarity of explanation, it is assumed that ImageNet is used, which is generally used for image classification, and it is also assumed that similar datasets are found among datasets, for which a model is trained, by adding fine-grained data like CUBS and Standford Cars and effective learning of those datasets is checked. In addition, it is assumed that black and white datasets like MNIST and Fashion MNIST are added which have different features from ImageNet and fine-grained data, and thus the effective expansion of data learned by the model is checked.

In addition, it is assumed that, while consecutive task learning is performed, the training datasets are learned in the order of ImageNet, S. Dogs, MNIST, CUBS, F.MNIST, S.Cars and Flowers. Herein, the training datasets and the number of classes are present below.

TABLE 1

| Task No. | Dataset | # Train | # Eval | # Classes |
|---|---|---|---|---|
| 1 | ImageNet | 1,281,167 | 50,000 | 1,000 |
| 2 | Stanford Dogs | 14,133 | 4,349 | 108 |

TABLE 1-continued

| Task No. | Dataset | # Train | # Eval | # Classes |
|---|---|---|---|---|
| 3 | MNIST | 60,000 | 10,000 | 10 |
| 4 | CUBS | 5,944 | 5,794 | 200 |
| 5 | Fashion MNIST | 60,000 | 10,000 | 10 |
| 6 | Stanford Cars | 8,144 | 8,041 | 196 |
| 7 | Flowers | 2,040 | 6,149 | 102 |

As an example, the results of the task similarity analysis for task learning may be as follows.

TABLE 2

| Dataset | S. Dogs | MNIST | CUBS | F. MNIST | S. Cars | Flowers |
|---|---|---|---|---|---|---|
| S. Dogs | O | — | — | — | — | — |
| MNIST | O | O | — | — | — | — |
| CUBS | O | X | O | — | — | — |
| F. MNIST | X | X | X | O | — | — |
| S. Cars | O | X | O | X | O | — |
| Flowers | O | X | O | X | X | O |

Table 2 above shows the results of similarity among multiple consecutive tasks, and as an embodiment, the results are presented as similarity among datasets which a model is trained with. S.Dogs and S.Cars denote the datasets Stanford Dogs and Stanford Cars respectively, and F.MNIST means Fashion MNIST. When a new dataset enters a model, an imbedding of an image is derived using the PCA dimension reduction technique. 30 dimensions are used in the experiment. Image imbedding is performed by selecting 100 images randomly for each type of datasets, and for example, the image imbedding may include dividing as many clusters as types of datasets through KNN algorithm. Next, a distance between a center value of a cluster corresponding to a previously learned dataset and a center value of a cluster corresponding to a current dataset may be calculated. As an embodiment, the Euclidean distance may be used as a metric for obtaining the distance. As an embodiment, when the distance is shorter than a preset threshold, the datasets are determined to be similar to each other. As an example, the threshold of 120 is used for the experiment.

In the results of Table 2 above, o denotes similar datasets, and x refers to datasets that are classified as different ones.

Figure 9:
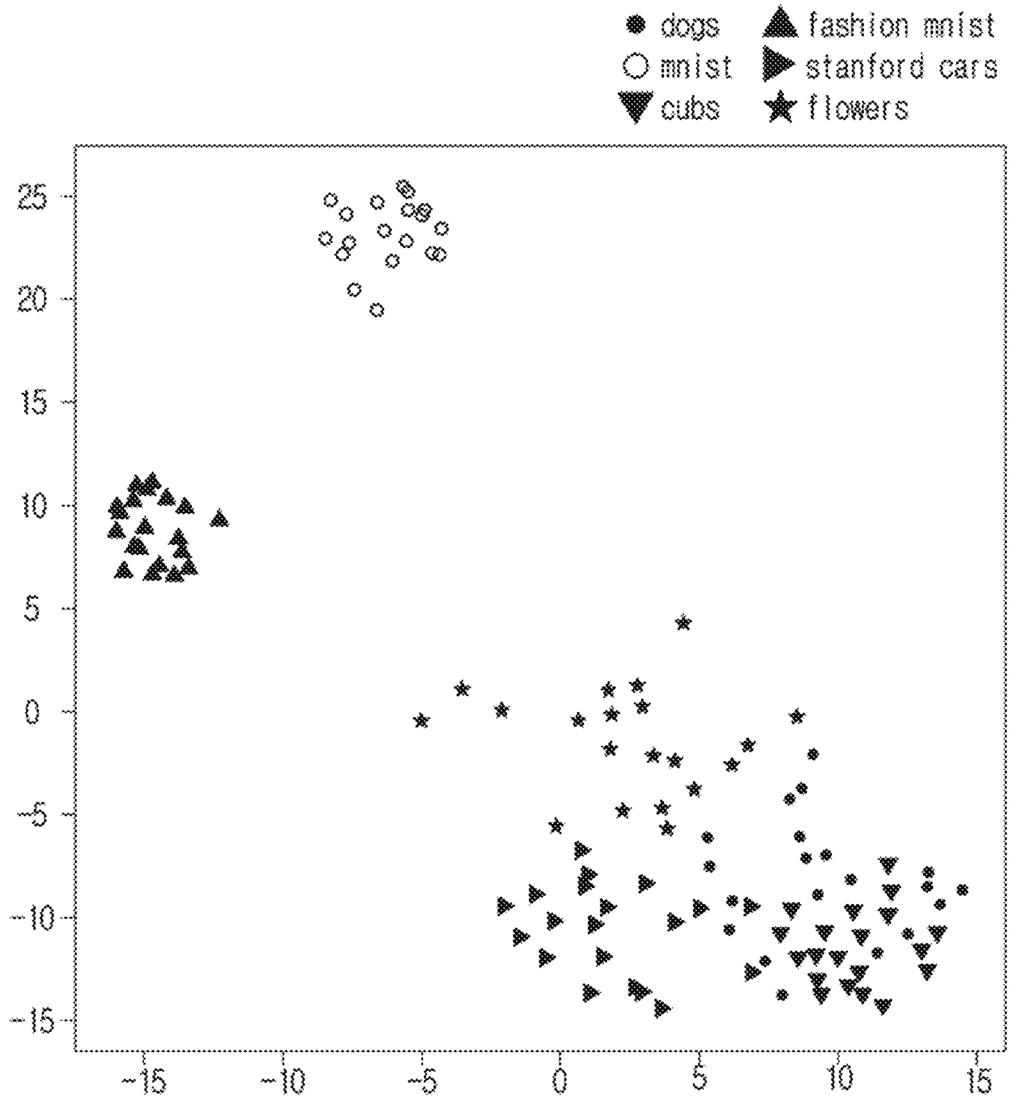
FIG. 9 is a view showing a 2D visualization result of dataset according to an embodiment of the present disclosure.

FIG. 9 is a view showing a 2D visualization result of dataset according to an embodiment of the present disclosure.

Specifically, FIG. 9 is a view showing imbedding of datasets used for the above-described experiment, which is reduced to 2 dimensions through PCA technique and then visualized. As high-dimensional image imbedding is reduced to 2 dimensions, the similarities are not the same as actual calculations, but the visualization is intended to show a rough distribution. The datasets MNIST and Fashion MNIST are placed far away from the fine-grained datasets in the 2D imbedding space.

Table 3 below shows image classification performance for 7 datasets according to the present disclosure. Particularly, there is a difference of accuracy from the third dataset MNIST to the last dataset Flowers. Compared to using all the parameters for previously learned datasets, learning based on similarity may improve performance effectively in consecutive learning.

TABLE 3

| | ImageNet | S. Dogs | MNIST | CUBS | F. MNIST | S. Cars | Flowers |
|---|---|---|---|---|---|---|---|
| PackNet | 76.16 | 84.36 | 99.64 | 78.93 | 93.22 | 85.78 | 87.52 |
| Ours | | 84.36 | 99.72 | 79.66 | 94.08 | 85.92 | 88.30 |

According to the present disclosure, instead of selecting data once in each network and performing learning from the very start, consecutive learning is possible by receiving an additional dataset and tasks so that this learning technique may be an essential technique for practical use of deep learning networks. In addition, for multi-task learning, which performs multiple tasks with a single deep learning network, a network supporting consecutive learning may not prevent performance from deteriorating based on limited memory capacity.

The various embodiments of the disclosure are not intended to be all-inclusive and are intended to illustrate representative aspects of the disclosure, and the features described in the various embodiments may be applied independently or in a combination of two or more.

Also, the various embodiments of the present invention may be implemented by hardware, firmware, software, or a combination thereof. In addition, the embodiments may be implemented not by only one software program but by a combination of two or more software programs, and one subject may not execute a whole process. For example, a machine learning process requiring advanced data operation capability and massive memory may be performed in a cloud or a server, and a user may use only a neural network that completes machine learning, but it is evident that the present disclosure is not limited to this implementation.

In the case of hardware implementation, one or more application specific integrated circuits (ASICs), digital signal processors (DSPs), digital signal processing devices (DSPDs), programmable logic devices (PLDs), field programmable gate arrays A general processor, a controller, a microcontroller, a microprocessor, and the like may be used for implementation. For example, various types of implementations including the general processor may be possible. It is also evident that one hardware unit or a combination of two or more hardware units may be applied to the present disclosure.

The scope of the present disclosure includes software or machine-executable instructions (for example, an operating system, applications, firmware, programs, etc.) that enable operations according to the methods of various embodiments to be performed on a device or computer, and a non-transitory computer-readable medium in which such software or instructions are stored and are executable on a device or computer.

A program stored in a non-transitory computer-readable medium according to an embodiment of the present disclosure may implement: performing a similarity analysis between a first task and a second task; training a neural network for the second task based on a result of the similarity analysis; and enabling the neural network to learn a second parameter allocated to a second training dataset based on a first parameter that is allocated to a first training dataset, when determining that the first training dataset used for the first task and the second training dataset used for the second task are similar.

Meanwhile, contents described with reference to respective drawings are not limited each corresponding drawing but may be applied in a complementary way unless there is concern of inconsistency.

It will be apparent to those skilled in the art that various substitutions, modifications and changes are possible are possible without departing from the technical features of the present disclosure. It is therefore to be understood that the scope of the present disclosure is not limited to the above-described embodiments and the accompanying drawings.

What is claimed is:

1. A method of training a neural network based on task similarity, the method comprising:

performing a similarity analysis between a first task using a first training dataset that is a first image dataset and a second task using a second training dataset that is a second image dataset, the similarity analysis comprising:

performing dimension reduction on the first image dataset resulting in a plurality of first image vectors;

performing dimension reduction on the second image dataset resulting in a plurality of second image vectors;

clustering the plurality of first image vectors and determining a center of the first cluster;

clustering the plurality of second image vectors and determining a center of the second cluster;

calculating a distance between the center of the first cluster and the center of the second cluster;

determining a similarity between the first task and the second task when the distance is less than a threshold; and training a neural network for the second task based on a result of the similarity analysis;

wherein, in response to determining that a first training dataset used for the first task and a second training dataset used for the second task are similar, the neural network learns a second parameter allocated to the second training dataset based on a first parameter allocated to the first training dataset.

2. The method of claim 1, wherein the neural network is pre-trained for the first task by using the first training dataset.

3. The method of claim 1, wherein the first parameter allocated to the first training dataset is selected from parameters of datasets already learned.

4. The method of claim 1, wherein the similarity is defined in a form of a one-hot vector.

5. The method of claim 1, wherein the neural network is based on a fully connected layer.

6. An apparatus that trains a neural network based on task similarity, the apparatus comprising:

memory configured to store data and instructions; and a processor configured to control the memory, wherein the processor executes the instructions to:

perform a similarity analysis between a first task using a first training dataset that is a first image dataset and a second task using a second training dataset that is a second image dataset, the similarity analysis comprising:

performing dimension reduction on the first image dataset resulting in a plurality of first image vectors;

performing dimension reduction on the second image dataset resulting in a plurality of second image vectors;

clustering the plurality of first image vectors and determining a center of the first cluster;

clustering the plurality of second image vectors and determining a center of the second cluster;

calculating a distance between the center of the first cluster and the center of the second cluster;

determining a similarity between the first task and the second task when the distance is less than a threshold train a neural network for the second task based on a result of the similarity analysis; and wherein, in response to determining that a first training dataset used for the first task and a second training dataset used for the second task are similar, the neural network learns a second parameter allocated to the second training dataset based on a first parameter allocated to the first training dataset.

7. The apparatus of claim 6, wherein the neural network is pre-trained for the first task by using the first training dataset.

8. The apparatus of claim 6, wherein the first parameter allocated to the first training dataset is selected from parameters of datasets already learned.

9. The apparatus of claim 6, wherein the similarity is defined in a form of a one-hot vector.

10. The apparatus of claim 7, wherein the neural network is based on a fully connected layer.

11. A non-transitory computer-readable medium including a stored program, the stored program including instructions that, when executed by a device, causes the device to:

perform a similarity analysis between a first task using a first training dataset that is a first image dataset and a second task using a second training dataset that is a second image dataset, the similarity analysis comprising:

performing dimension reduction on the first image dataset resulting in a plurality of first image vectors;

performing dimension reduction on the second image dataset resulting in a plurality of second image vectors;

clustering the plurality of first image vectors and determining a center of the first cluster;

clustering the plurality of second image vectors and determining a center of the second cluster;

calculating a distance between the center of the first cluster and the center of the second cluster;

determining a similarity between the first task and the second task when the distance is less than a threshold; and train a neural network for the second task based on a result of the similarity analysis;

wherein in response to determining that a first training dataset used for the first task and a second training dataset used for the second task are similar, the neural network learns a second parameter allocated to second training dataset based on a first parameter that is allocated to first training dataset.

12. The non-transitory computer-readable medium of claim 11, wherein the first parameter allocated to the first training dataset is selected from parameters of datasets already learned.

13. The non-transitory computer-readable medium of claim 11, wherein the neural network is pre-trained for the first task by using the first training dataset.

14. The non-transitory computer-readable medium of claim 11, wherein the similarity is defined in a form of a one-hot vector.

15. The non-transitory computer-readable medium of claim 11, wherein the neural network is based on a fully connected layer.

* * * * *